United States Patent [19]

Nakano et al.

[11] Patent Number: 5,672,671
[45] Date of Patent: Sep. 30, 1997

[54] PROCESS FOR PRODUCING DIORGANOPOLYSILOXANE

[75] Inventors: Takaharu Nakano; Katsuyoshi Tsuchiya; Shunji Yoshimatsu; Takeru Fuchigami, all of Kumamoto, Japan

[73] Assignee: Chisso Corporation, Osaka-fu, Japan

[21] Appl. No.: 668,163

[22] Filed: Jun. 21, 1996

[51] Int. Cl.$^6$ ............................................... C08G 77/06
[52] U.S. Cl. ................................. 528/14; 528/26; 528/37
[58] Field of Search .............................. 528/14, 26, 37, 528/34

[56] References Cited

U.S. PATENT DOCUMENTS

| | | | |
|---|---|---|---|
| 4,625,011 | 11/1986 | Kosal et al. | 528/14 |
| 5,272,225 | 12/1993 | Ogawa et al. | 525/477 |

*Primary Examiner*—Ralph H. Dean
*Attorney, Agent, or Firm*—Wenderoth, Lind & Ponack

[57] ABSTRACT

A process is disclosed for producing a diorganopolysiloxane by polymerizing a cyclic siloxane expressed by the following general formula (2)

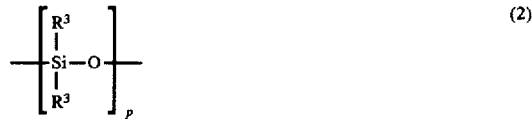

wherein $R^3$ represents methyl group, ethyl group, or phenyl group, and p is an integer of 3 or 4, by an anion living polymerization using a lithium trialkyl-silonolate or an alkyl lithium as a polymerization initiator and then terminating the anion living polymerization with an acid or a chlorosilane derivative, the improvement comprising treating a diorganopolysiloxane which is modified with a silanol at both its terminals and included in the cyclic siloxane as impurities, with an acetylating agent.

4 Claims, No Drawings

PROCESS FOR PRODUCING DIORGANOPOLYSILOXANE

BACKGROUND OF THE INVENTION

1. Field of the Invention

The present invention relates to a novel process for producing a diorganopolysiloxane. More specifically, the present invention relates to a novel process for producing a diorganopolysiloxane of a high purity, having a functional group at one terminal of the molecule.

2. Description of the Related Art

Diorganopolysiloxanes having a functional group at only one terminal of the molecule and graft polymers obtained from the diorganopolysiloxanes have been used for surface treating agents for polymeric materials such as several kinds of films, plastics, rubbers, and waxes, papers, and glasses, and as modifiers for daily necessaries such as shampoos, rinses, and hair setting chemicals. The diorganopolysiloxanes and graft polymers can impart such functions as water repellency, stainproofness, antiadhesiveness, heat resistance, mar resistance, and biocompatibility to the surface treating agents and modifiers.

Diorganopolysiloxanes are produced by known methods. For instance, a method for producing a diorganopolysiloxane is disclosed in Laid-open Japanese Patent Publication No. 59-78236 in which a cyclic siloxane is subjected to an anion living polymerization by using a trialkylsilanolate as initiator and then reacted with a chlorosilane derivative to terminate the polymerization.

However, the cyclic siloxanes used as starting raw material for producing a diorganosiloxane and expressed by the general formula (2) mentioned below sometimes contain, as impurities, a diorganopolysiloxane modified with a silanol at both terminals of the molecule (hereinafter referred to as disilanol). When a cyclic siloxane containing a disilanol is polymerized by known methods, disilanol also acts as initiator to the effect that a diorganopolysiloxane having a functional group at both terminals comes to be included, as impurities, in a final product in addition to the objective diorganopolysiloxane having a functional group only at one terminal. For instance, when methacryloxypropyldimethylchlorosilane is used as polymerization terminator, a diorganopolysiloxane modified with methacryloxy group at both terminals comes to be included as impurities in the final product of diorganopolysiloxane modified with methacryloxy group at one terminal. When an attempt is made to produce a graft polymer having an accurate structure by copolymerizing a diorganopolysiloxane modified at its one end with methacryloxy group and containing these impurities, with another radical polymerizable monomer, the molecular weight of the graft polymer to be obtained is undesirably increased with the increase of the content of a diorganopolysiloxane modified with methacryloxy group at both terminals, that is, with increase of the content of disilanol contained as impurities in the cyclic siloxane, since the diorganopolysiloxane modified with methacryloxy group at both terminals acts as crosslinking agent; and the graft polymer finally forms a gel to the effect that the objective graft polymer can not be obtained.

Accordingly, it is necessary to remove the disilanol in a cyclic siloxane or repress the effect of disilanol on living polymerization. As a method for removing disilanol, there is known a method in which a cyclic siloxane is distilled or treated with a silica. However, it is difficult to separate the disilanol having a boiling point close to that of the cyclic siloxane by distillation. In contrast, in the treatment with a silica, the cyclic siloxane is adsorbed to the silica and a part of the cyclic siloxane is transformed into disilanol, and thus much of the cyclic siloxane is lost.

As methods for repressing the effect of disilanol on living polymerization, Laid-open Japanese Patent Publication No. Hei 6-340743 proposes one in which disilanol is transformed into a silyl in advance with a silylizing agent prior to the initiation of living polymerization, or disilanol is lithiated with an alkyl lithium in advance and then transformed into a silyl with a silylizing agent having a halogen atom bonded to silicon atom. However, these methods are insufficient as the method for repressing the effect of disilanol since only a part of the disilanol in the cyclic siloxane is transformed into a silyl.

SUMMARY OF THE INVENTION

As a result of diligent investigation by the present inventors under such situation, it has been found that a diorganopolysiloxane of a high purity, containing no diorganopolysiloxane modified with a functional group at both terminals can be produced by transforming the disilanol contained in a cyclic siloxane expressed by general formula (2) into an oligomer which does not participate in anion living polymerization, by treating the cyclic siloxane with an acetylating agent prior to the initiation of polymerization.

DESCRIPTION OF THE PREFERRED EMBODIMENTS

The present invention relates to the process for producing a diorganopolysiloxane by polymerizing a cyclic siloxane expressed by the following general formula (2)

wherein $R^3$ represents methyl group, ethyl group, or phenyl group, and p is an integer of 3 or 4, by an anion living polymerization using an initiator expressed by the following general formula (1)

(1)

wherein $R^1$ represents an alkyl group having 1 to 4 carbon atoms or a group expressed by the following general formula

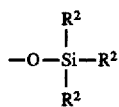

in which $R^2$ represents an alkyl group having 1 to 4 carbon atoms, and then terminating the anion living polymerization with an acid or a chlorosilane derivative expressed by the following general formula (3)

(3)

wherein $R^3$ represents the same group as mentioned above, $R^4$ represents hydrogen atom or an organic functional group, X represents a halogen atom, and n is an integer of 0 to 3, wherein a diorganopolysiloxane modified with a silanol at its both terminals and included in the cyclic silane as impurities, is treated with an acetylating agent.

As the acetylating agent, acetyl chloride or anhydrous acetic acid is preferably used.

As the initiator of the anion living polymerization, a lithium trialkylsilanolate or an alkyl lithium can be used. The initiator specifically includes lithium trimethylsilanolate, lithium triethylsilanolate, lithium tripropylsilanolate, lithium tributylsilanolate, methyl lithium, ethyl lithium, n-butyl lithium, sec-butyl lithium, and tert-butyl lithium. Among them, n-butyl lithium or lithium trimethylsilanolate is particularly preferred.

The cyclic siloxane expressed by general formula (2) includes hexamethylcyclotrisiloxane, octamethylcyclotetrasiloxane, hexaethylcyclotrisiloxane, octaethylcyclotetrasiloxane, hexaphenylcyclotrisiloxane, octaphenylcyclotetrasiloxane, trimethyltriphenylcyclotrisiloxane, and tetramethyltetraphenylcyclotetrasiloxane. Among them, hexamethylcyclotrisiloxane and octamethylcyclotetrasiloxane are preferable, and hexamethylcyclotrisiloxane is particularly desirable.

Addition of the acetylating agent is preferably conducted after the initiator expressed by general formula (1) was added to a cyclic siloxane which is expressed by general formula (2) and dissolved in advance in a suitable solvent described below. Acetylating agent is preferably added in an amount which is more than the stoichiometric amount to silanol groups in the disilanol contained, as impurities, in the cyclic siloxane. When a cyclic siloxane is to be treated with anhydrous acetic acid in a nonpolar solvent of hydrocarbon type, a method can be used in which a cyclic siloxane is first reacted with an alkyl lithium in an amount of twice as much as the stoichiometric amount to silanol group, then anhydrous acetic acid is added in the stoichiometric amount to the silanol group, the mixture is treated under the conditions mentioned below, and then an initiator expressed by general formula (1) is added.

Amount of the disilanol in the cyclic siloxane expressed by general formula (2) can be determined by lithium aluminum dibutylamide reagent (G. E. Kellum and K. L. Uglum, Anal. Chem. 39, 1623 (1967)).

Conditions for the acetylation are different in accordance with the type of the solvent in which the cyclic siloxane expressed by general formula (2) is dissolved and the type of acetylating agent. When the solvent is a hydrocarbon type nonpolar solvent such as toluene and xylene, and the acetylating agent is acetyl chloride, the temperature for the acetylation is not particularly restricted and one from room temperature up to the boiling point of the solvent can be adopted. Time for the acetylation is not particularly restricted, either. Thus, the polymerization may be initiated by adding a living polymerization accelerator mentioned below immediately after acetyl chloride was added. Also, the polymerization may be initiated by treating disilanol with acetyl chloride for several hours and then adding a living polymerization accelerator.

When anhydrous acetic acid is used as acetylating agent, the treatment for acetylation may be performed at a temperature from room temperature up to the boiling point of the solvent. In order to sufficiently conduct the acetylation in this case, it is preferably to use a nonpolar solvent having a boiling point higher than 50° C. and conduct the treatment at a temperature from 50° C. to 100° C. in particular. Time for the acetylation is desirably 30 min to 3 hours at the acetylating temperature mentioned above.

When a polar solvent such as tetrahydrofuran is used as the solvent for dissolving a cyclic siloxane expressed by general formula (2), it is preferable to add an acetylating agent, acetyl chloride or anhydrous acetic acid, at the temperature used for the polymerization immediately after an initiator was added, since the polymerization is initiated immediately after the addition of initiator.

Polymerization degree of a living polymer obtained by the anion living polymerization can be controlled as desired by selecting the mole ratio of an initiator to be used to a cyclic siloxane consumed in the polymerization. However, when an initiator expressed by general formula (1) is added to a cyclic siloxane expressed by general formula (2), and the disilanol in the cyclic siloxane is treated with an acetylating agent in the present invention, the disilanol is lithiated with the initiator, the lithiated disilanol is acetylized, and acetyl group is reacted with the initiator and substituted therewith. That is, 2 chemical equivalents of the initiator expressed by general formula (1) is consumed against 1 chemical equivalent of acetylating agent. Accordingly, a supplemental amount of the initiator expressed by general formula (1) to be added must be twice as much, by mole, as that of the acetylating agent used, for calculating the total amount of the initiator to actually be used.

When a method is used in which a cyclic siloxane is first reacted with an alkyl lithium in an amount of twice as much as the stoichiometric amount to silanol group and then anhydrous acetic acid in the stoichiometric amount to the silanol group is added in the treatment with anhydrous acetic acid in a nonpolar solvent of hydrocarbon type, it is not necessary to additionally use an initiator in the amount of twice as much as added anhydrous acetic acid by mole as supplement.

Anion living polymerization is conducted in the presence of a suitable solvent. As the solvent, there can be used a mixed solvent prepared by adding a polar solvent such as dimethyl formamide, dimethyl acetamide, tetrahydrofuran, dimethyl sulfoxide, and diglyme as polymerization accelerator to a nonpolar solvent such as toluene, benzene, xylene, and n-hexane; and the polar solvent mentioned above is preferably used. Preferably, these mixed solvents and polar solvents are sufficiently purified prior to use.

Temperature for anion living polymerization is preferably −50° C. to 140° C., and more desirably −10° C. to 40° C. Time for polymerization is considerably varied in accordance with reaction temperature. When the reaction temperature is −10° C. to 40° C., the reaction time is suitably 1 to 30 hours.

Progress of the anion living polymerization can be traced by determining the reduced amount of the cyclic siloxane expressed by general formula (2) by an analytical means such as gas chromatography. The anion living polymerization is preferably terminated by adding an acid or a chlorosilane derivative expressed by general formula (3) when the conversion of the cyclic siloxane mentioned above reaches a specified value. Conversion of the cyclic siloxane expressed by general formula (2) is preferably 60 to 100%, and more desirably 75 to 98%.

In the reaction for terminating the anion living polymerization in the present invention, the active sites in the terminals of propagating polymers in living polymerization are reacted with an acid or a chlorosilane derivative expressed by general formula (3).

As the acid to be used at this stage, hydrated carbonic acid gas, a mineral acid such as a diluted hydrochloric acid and phosphoric acid, and an organic acid such as acetic acid and propionic acid are specifically mentioned as examples.

On the other hand, as the chlorosilane derivative, dimethylchlorosilane, dimethylvinylchlorosilane, chloropropyldimethylchlorosilane, methacryloxypropyldimethylchlorosilane, acryloxypropyldimethylchlorosilane, vinylbenzyldimethylchlorosilane, styryldimethylchlorosilane are specifically mentioned as examples.

In the present invention, it is preferable to add deionized water to the polymer solution to wash the polymer, to dehydrate the organic layer with anhydrous magnesium sulfate and subject the layer to a filtration, and to separate reaction solvent, unreacted starting raw materials, and impurities of a low molecular weight from the filtrated solution by distillation under a reduced pressure to isolate the objective product from the polymer solution after the termination of anion living polymerization.

Diorganopolysiloxanes prepared by the method mentioned above are monodispersion polymers having a controlled molecular weight distribution and having one terminal functional group per molecule.

More specifically, diorganopolysiloxanes produced according to the present invention are monodispersion polymers which have a controlled narrow molecular weight distribution and a restrained susceptivity to side reaction; have one functional group only at one terminal of the molecule; and have a small content of the siloxane having a functional group at both terminals. By using such diorganopolysiloxane of high purity, graft polymers having an accurate structure can be obtained without causing the growing of the graft polymer up to macromolecular graft polymers or gelation of the graft polymers. Such high purity diorganopolysiloxane modified with a functional group at one terminal and graft polymers obtained from the modified diorganopolysiloxane can be used for surface treating agents for polymeric materials such as several kinds of films, plastics, rubbers, and waxes, papers, and glasses, and as modifiers for daily necessaries such as shampoos, rinses, and hair setting chemicals, to impart such functions as water repellency, stainproofness, antiadhesiveness, heat resistance, mar resistance, and biocompatibility to the surface treating agents and modifiers.

EXAMPLE

Now, the process for producing a diorganopolysiloxane according to the present invention will be described in further detail with reference to Examples, Comparative Examples, and Referential Example. However, it should be understood that the present invention is by no means restricted by such specific Examples.

Example 1

In a 300 ml flask were charged 100 g of toluene and 90 g (0.40 mol) of hexamethylcyclotrisiloxane having a silanol group content of 150 ppm ($0.794 \times 10^{-3}$ mol) determined with an amide reagent, under nitrogen gas stream, and then subjected to an azeotropic dehydration at 150° C. for 1 hour while distilling off 24 g of the solution of toluene and hexamethylcyclotrisiloxane. After the solution in the flask was cooled down to room temperature, the solution was subjected to an analysis for composition with GC (gas chromatography) to find that the solution comprised 83.0 g of toluene and 83.0 g of hexamethylcyclotrisiloxane.

Subsequently, the solution in the flask was added with 4.5 ml ($7.38 \times 10^{-3}$ mol) of n-butyl lithium solution in hexane (1.64 mol/l), stirred for 1 hour, added with 0.07 g ($0.69 \times 10^{-3}$ mol) of anhydrous acetic acid, and stirred at 100° C. for 30 minutes. Then, the solution was added with 8 ml of dimethyl formamide at 15° C. and subjected to polymerization for 2 hours.

Subsequently, the solution was added with 1.6 g ($7.2 \times 10^{-3}$ mol) of 3-methacryloxypropyldimethylchlorosilane and stirred for 3 hours to terminate the polymerization. Conversion of hexamethylcyclotrisiloxane at this time was 82%. Then, the polymer solution thus obtained was added with deionized water to wash the polymer. The organic layer was dehydrated with anhydrous magnesium sulfate and filtrated. The filtrated solution was subjected to a distillation with a rotary evaporator to distill off tulene, unreacted hexamethylcyclotrisiloxane, and low molecular weight impurities.

The amount of the diorganopolysiloxane thus obtained was 68 g. Number average molecular weight of the diorganopolysiloxane was 14,100 by GPC method (gel permeation chromatography) (polystyrene conversion) and dispersion degree of the diorganopolysiloxane was 1.03

Example 2

In a 300 ml flask were charged 100 g of toluene and 90 g (0.40 mol) of hexamethylcyclotrisiloxane containing a silanol group of 273 ppm ($1.45 \times 10^{-3}$ mol) under nitrogen gas stream, and then subjected to an azeotropic dehydration at 150° C. for 1 hour in the same manner as in Example 1. After the solution in the flask was cooled down to room temperature, the solution was subjected to an analysis for composition with GC to find that the solution comprised 80.0 g of toluene and 81.0 g of hexamethylcyclotrisiloxane.

Subsequently, the solution in the flask was added with 5.2 ml ($8.53 \times 10^{-3}$ mol) of n-butyl lithium solution in hexane (1.64 mol/l), stirred for 1 hour, added with 0.115 g ($1.47 \times 10^{-3}$ mol) of acetyl chloride, and stirred for 30 minutes. Then, the solution was added with 8 ml of dimethyl formamide at 15° C. and subjected to polymerization for 2.5 hours.

Subsequently, the solution was added with 1.5 g ($6.7 \times 10^{-3}$ mol) of 3-methacryloxypropyldimethylchlorosilane and stirred for 3 hours to terminate the polymerization. Conversion of hexamethylcyclotrisiloxane at this time was 90%. Then, the after treatments in Example 1 were repeated.

The amount of the diorganopolysiloxane thus obtained was 70 g. Number average molecular weight of the diorganopolysiloxane was 16,500 by GPC method (polystyrene conversion) and the dispersion degree of the diorganopolysiloxane was 1.03.

Example 3

In a 300 ml flask were charged 100 g of toluene and 90 g (0.40 mol) of hexamethylcyclotrisiloxane containing a silanol group of 491 ppm ($2.6 \times 10^{-3}$ mol) under nitrogen gas stream, and then subjected to an azeotropic dehydration at 150° C. for 1 hour in the same manner as in Example 1. After the solution in the flask was cooled down to room temperature, the solution was subjected to an analysis for composition with GC to find that the solution comprised 86.4 g of toluene and 84.3 g of hexamethylcyclotrisiloxane.

Subsequently, 3.2 ml ($5.21 \times 10^{-3}$ mol) of n butyl lithium solution in hexane (1.63 mol/l) was added, stirred for 1 hour, 0.263 g ($2.57 \times 10^{-3}$ mol) of anhydrous acetic acid was added, and then stirred at 100° C. for 30 minutes. After cooled down to room temperature, 5.0 ml ($8.15 \times 10^{-3}$ mol) of n-butyl lithium solution in hexane (1.63 mol/l) was added as initiator, and stirred for 1 hour. Then, the solution was added with 9 ml of dimethyl formamide at 15° C. and subjected to polymerization for 2 hours.

Subsequently, the solution was added with 2.2 g ($10 \times 10^{-3}$ mol) of 3-methacryloxypropyldimethylchlorosilane and stirred for 3 hours to terminate the polymerization. Conversion of hexamethylcyclotrisiloxane at this time was 88%. Then, the after treatments in Example 1 were repeated.

The amount of the diorganopolysiloxane thus obtained was 84 g. Number average molecular weight of the diorganopolysiloxane was 11,000 by GPC method (polystyrene conversion) and the dispersion degree of the diorganopolysiloxane was 1.04.

Comparative Example 1

In the same manner as in Example 1, 100 g of toluene and 90 g (0.4 mol) of hexamethylcyclotrisiloxane containing no silanol group were charged in a flask and subjected to an azeotropic dehydration. The solution after the azeotropic dehydration comprised 88 g of toluene and 84.5 g of hexamethylcyclotrisiloxane.

Subsequently, the solution in the flask was added with 3.6 ml ($5.98 \times 10^{-3}$ mol) of n-butyl lithium solution in hexane (1.66 mol/l) and stirred for 1 hour. Then, the solution was added with 8 ml of dimethyl formamide at 15° C. and subjected to polymerization for 2 hours. Further, 1.6 g ($7.2 \times 10^{-3}$ mol) of 3-methacryloxypropyldimethylchlorosilane was added to the solution and stirred for 3 hours to terminate the polymerization. Conversion of hexamethylcyclotrisiloxane at this time was 86%. Then, the after treatments in Example 1 were repeated.

The amount of the diorganopolysiloxane thus obtained was 71 g. Number average molecular weight of the diorganopolysiloxane was 15,100 by GPC method (polystyrene conversion) and the dispersion degree of the diorganopolysiloxane was 1.04.

Comparative Example 2

In the same manner as in Example 1, 100 g of toluene and 90 g (0.4 mol) of hexamethylcyclotrisiloxane containing 141 ppm ($0.746 \times 10^{-3}$ mol) of silanol group were charged in a flask and subjected to an azeotropic dehydration. The solution after the azeotropic dehydration comprised 82.0 g of toluene and 82.0 g of hexamethylcyclotrisiloxane.

Subsequently, the solution in the flask was added with 3.4 ml ($5.64 \times 10^{-3}$ mol) of n-butyl lithium solution in hexane (1.66 mol/l) and stirred for 1 hour. Then, the solution was added with 8 ml of dimethyl formamide at 15° C. and subjected to polymerization for 2.3 hours. Further, 1.5 g ($6.8 \times 10^{-3}$ mol) of 3-methacryloxypropyldimethylchlorosilane was added to the solution and stirred for 3 hours to terminate the polymerization. Conversion of hexamethylcyclotrisiloxane at this time was 88%. Then, the after treatments in Example 1 were repeated.

The amount of the diorganopolysiloxane thus obtained was 70 g. Number average molecular weight of the diorganopolysiloxane was 16,700 by GPC method (polystyrene conversion) and the dispersion degree of the diorganopolysiloxane was 1.05.

Comparative Example 3

In the same manner as in Example 1, 100 g of toluene and 90 g (0.4 mol) of hexamethylcyclotrisiloxane containing 270 ppm ($1.43 \times 10^{-3}$ mol) of silanol group were charged in a flask and subjected to an azeotropic dehydration. The solution after the azeotropic dehydration comprised 81.0 g of toluene and 81.0 g of hexamethylcyclotrisiloxane.

Subsequently, the solution in the flask was added with 5.5 ml ($9.13 \times 10^{-3}$ mol) of n-butyl lithium solution in hexane (1.66 mol/l) and stirred for 1 hour. Then, the solution was added with 8 ml of dimethyl formamide at 15° C. and subjected to polymerization for 2 hours. Further, 2.5 g (0.011 mol) of 3-methacryloxypropyldimethylchlorosilane was added to the solution and stirred for 3 hours to terminate the polymerization. Conversion of hexamethylcyclotrisiloxane at this time was 90%. Then, the after treatments in Example 1 were repeated.

The amount of the diorganopolysiloxane thus obtained was 72 g. Number average molecular weight of the diorganopolysiloxane was 11,300 by GPC method (polystyrene conversion) and the dispersion degree of the diorganopolysiloxane was 1.06.

Comparative Example 4

In the same manner as in Example 1, 100 g of toluene and 90 g (0.4 mol) of hexamethylcyclotrisiloxane containing 491 ppm ($2.6 \times 10^{-3}$ mol) of silanol group were charged in a flask and subjected to an azeotropic dehydration. The solution after the azeotropic dehydration comprised 87.0 g of toluene and 85.2 g of hexamethylcyclotrisiloxane.

Subsequently, the solution in the flask was added with 5.0 ml ($8.15 \times 10^{-3}$ mol) of n-butyl lithium solution in hexane (1.63 mol/l) and stirred for 1 hour. Then, the solution was added with 9 ml of dimethyl formamide at 15° C. and subjected to polymerization for 2 hours. Further, 2.2 g (0.010 mol) of 3-methacryloxypropyldimethylchlorosilane was added to the solution and stirred for 3 hours to terminate the polymerization. Conversion of hexamethylcyclotrisiloxane at this time was 81%. Then, the after treatments in Example 1 were repeated.

The amount of the diorganopolysiloxane thus obtained was 84 g. Number average molecular weight of the diorganopolysiloxane was 13,700 by GPC method (polystyrene conversion) and the dispersion degree of the diorganopolysiloxane was 1.06.

Comparative Example 5

In the same manner as in Example 1, 100 g of toluene and 90 g (0.4 mol) of hexamethylcyclotrisiloxane containing 491 ppm ($2.6 \times 10^{-3}$ mol) of silanol group were charged in a flask and subjected to an azeotropic dehydration. The solution after the azeotropic dehydration comprised 87.7 g of toluene and 83.3 g of hexamethylcyclotrisiloxane.

Subsequently, the solution in the flask was added with 1.6 mol ($2.61 \times 10^{-3}$ mol) of n-butyl lithium solution in hexane (1.63 mol/l) and stirred for 1 hour. Then, 0.282 g ($2.60 \times 10^{-3}$ mol) of trimethylchlorosilane was added and stirred at room temperature for 1 hour. Then, 5.0 ml ($8.15 \times 10^{-3}$ mol) of n-butyl lithium solution in hexane (1.63 mol/l) was added as initiator and further stirred for 1 hour. To this solution was added 9 ml of dimethyl formamide at 20° C. and subjected to polymerization for 2.5 hours. Further, 2.2 g (0.010 mol) of 3-methacryloxypropyldimethylchlorosilane was added to the solution and stirred for 3 hours to terminate the polymerization. Conversion of hexamethylcyclotrisiloxane at this time was 89%. Then, the after treatments in Example 1 were repeated.

The amount of the diorganopolysiloxane thus obtained was 83 g. Number average molecular weight of the diorganopolysiloxane was 12,200 by GPC method (polystyrene conversion) and the dispersion degree of the diorganopolysiloxane was 1.05.

Referential Example

Macromonomers obtained by the Examples and Comparative Examples mentioned above and an acrylic monomer were copolymerized, respectively, in the following manner to obtain graft polymers:

In a 300 ml flask were charged 150 g of toluene, 22.5 g of the macromonomer, 45 g of butyl acrylate, and 1.00 g of azobibisobutyronitrile under nitrogen gas stream and subjected to polymerization at 62° C. for 8 hours. Weight average molecular weight of the graft polymers thus obtained are shown in Table 1. The weight average molecular weight in the Table were obtained by GPC method (polystyrene conversion).

TABLE 1

| Macromonomer | Weight average molecular weight of graft polymer | Molecular weight distribution |
| --- | --- | --- |
| Example 1 | 218,000 | 3.22 |
| Example 2 | 235,000 | 3.24 |
| Example 3 | 238,000 | 3.95 |
| Comparative Example 1 | 218,000 | 3.01 |
| Comparative Example 2 | 319,400 | 3.73 |
| Comparative Example 3 | 447,000 | 6.77 |
| Comparative Example 4 | Gelation | — |
| Comparative Example 5 | 384,000 | 5.66 |

As will be clear from Table 1, when a cyclic siloxane is not treated with an acetylating agent, the weight average molecular weight of the graft copolymers is increased with increase of the content of silanol group in hexamethylcyclotrisiloxane. In contrast, when the acetylation is performed, the graft polymers to be obtained do not become macromolecular weight polymers, the molecular weight of the graft polymers are about the same as that of the graft polymer in a blank test (Comparative Example 1) in which hexamethylcyclotrisiloxane containing no silanol group was used, and a greater effect than that by the treatment with trimethylchlorosilane is noticed.

We claim:

1. In a process for producing a diorganopolysiloxane, which comprises subjecting a cyclic siloxane expressed by formula (2)

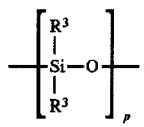

wherein $R^3$ represents methyl, ethyl or phenyl, and p is an integer of 3 or 4, containing as impurity a diorganopolysiloxane modified with a silanol group at both its terminals, to an anion living polymerization using an initiator expressed by formula (1)

$$R^1Li \quad (1)$$

wherein $R^1$ represents an alkyl group having 1 to 4 carbon atoms or a group expressed by the formula

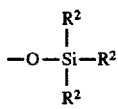

in which $R^2$ represents an alkyl group having 1 to 4 carbon atoms, and terminating the anion living polymerization with an acid or a chlorosilane expressed by formula (3)

$$R^4R^3{}_n SiX_{3-n} \quad (3)$$

wherein $R^3$ is as defined above, $R^4$ represents a hydrogen atom or an organic functional group, X represents a halogen atom, and n is an integer of 0 to 2, the improvement which comprises acetylating the diorganopolysiloxane modified with a silanol at both its terminals with an acetylating agent prior to initiation of the polymerization.

2. The process according to claim 1, wherein the acetylating agent is acetyl chloride or anhydrous acetic acid.

3. The process according to claim 1, wherein the acetylating agent is added to the cyclic siloxane after the initiator.

4. The process according to claim 1, wherein the amount of acetylating agent is more than the stoichiometric amount based on the silanol groups in the diorganopolysiloxane impurity.

* * * * *